United States Patent

Popadick et al.

[15] 3,657,799
[45] Apr. 25, 1972

[54] METHOD OF MAKING AN ELECTRODE HAVING A REFRACTORY METAL ARCING PORTION

[72] Inventors: Carl C. Popadick, West Chester; Joseph L. Talento, Media, both of Pa.

[73] Assignee: General Electric Company

[22] Filed: Dec. 18, 1969

[21] Appl. No.: 886,143

[52] U.S. Cl. ..........................29/25.17, 117/227, 117/120, 29/182.1, 29/149.5 PM
[51] Int. Cl. ................B22d 21/02, B22d 23/06, B22d 27/20
[58] Field of Search .....................164/66, 95, 111; 29/182.1, 29/149.5 PM; 75/200; 117/227, 120

[56] References Cited

UNITED STATES PATENTS

| | | |
|---|---|---|
| 2,612,443 | 9/1952 | Goetzel et al. ..........................75/200 |
| 2,671,955 | 3/1954 | Grubel et al. ..........................117/120 X |
| 3,489,530 | 1/1970 | Schreiner..............................29/182.1 |
| 2,034,550 | 3/1936 | Adams....................................75/200 |

*Primary Examiner*—William L. Jarvis
*Attorney*—J. Wesley Haubner, William Freedman, Frank L. Neuhauser, Oscar B. Waddell and Joseph B. Forman

[57] ABSTRACT

Discloses a method of making an electrode that involves providing a cup-shaped shell of sintered refractory particles, placing within the shell non-refractory backing metal, heating in a reducing atmosphere to melt the backing metal and cause it to infiltrate the shell, replacing the reducing atmosphere with an inert environment, holding the assembly in the inert environment for a sufficient period to remove a substantial quantity of dissolved gases from the molten backing metal, and then cooling within said inert environment to solidify said backing metal and remove additional dissolved gases.

10 Claims, 3 Drawing Figures

PATENTED APR 25 1972

3,657,799

INVENTORS:
CARL C. POPADICK,
JOSEPH L. TALENTO,

BY William Freedman
ATTORNEY

METHOD OF MAKING AN ELECTRODE HAVING A REFRACTORY METAL ARCING PORTION

This invention relates to a method for making an electric contact or electrode and relates, more particularly, to a method for joining the refractory arcing portion of the electrode to a metal backing.

One way of joining a refractory arcing portion to a metal backing is by providing closely conforming surfaces on the two parts, interposing brazing metal between these two surfaces, and then melting the brazing metal to produce a brazed joint between the two surfaces. While this method is satisfactory where the mating surfaces are substantially planar, it has not been entirely satisfactory where the mating surfaces are complexly curved, particularly where the two metals have widely different coefficients of thermal expansion. Slight mismatches in the configuration of the two surfaces have resulted in relatively weak, void-containing joints that have been unable to withstand without damage the stresses resulting from wide temperature changes and the large inequalities in expansion produced thereby.

An object of our invention is to provide a method of joining a refractory arcing portion to a metal backing which requires no precise surface shaping to assure matching of the surfaces and yet provides an exceptionally strong void-free joint that can successfully withstand wide temperature changes despite widely different coefficients of thermal expansion of the two metals.

Still another object is to provide a casting method for joining these two parts which results in a high strength backing that is relatively free of porosity.

In carrying out the invention in one form, we provide a cup-shaped shell of sintered refractory particles and place within this shell a quantity of non-refractory backing metal. We heat this assembly in a reducing atmosphere, e.g., hydrogen, to melt the backing metal and cause a portion thereof to infiltrate the shell. We then replace the reducing atmosphere with an inert environment, e.g., an argon atmosphere, and hold the assembly containing the molten backing metal in this inert environment for a sufficient period to remove a substantial quantity of the gases dissolved in the molten backing metal. Thereafter, we cool the assembly while in the inert environment, thereby causing solidification of the backing metal and removing additional dissolved gases during the cooling process.

For a better understanding of the invention, reference may be had to the following description taken in conjunction with the accompanying drawing, wherein.

Figure 1:
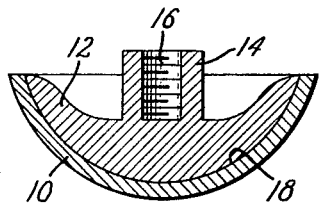
FIG. 1 is a cross sectional view of an arcing electrode made by a method embodying our invention.

Referring now to FIG. 1, there is shown an electric contact, or electrode, which has been made by a method embodying our invention. This electrode comprises an arcing portion 10 which is a partially spherical shell, and a backing portion 12 which is bonded to the shell. The backing portion 12 comprises a boss 14 that is provided with a tapped hole 16 to facilitate attachment of the electrode to a suitable conductive rod (not shown).

The arcing portion 10 is of refractory metal particles sintered together and infiltrated with a highly conductive metal, such as copper. By way of example, the refractory metal particles may be of tungsten, molybdenum, or carbides thereof.

The backing portion 12 is of a high strength, easily machineable metal, such as a suitable copper-nickel, copper-beryllium, or copper-iron alloy. In the illustrated embodiment, the backing 12 is joined to the arcing portion 10 along a partially spherical interface 18.

The method of making the electrode of FIG. 1 involves, first of all, providing a cup-shaped shell 10a, generally hemispherical in form, that is made of the above-described refractory metal particles sintered together. In one embodiment, this shell is infiltrated with a highly conductive metal such as copper prior to joining the shell to the backing metal. To prevent loss of molten infiltrant from the refractory shell during subsequent heating steps, the outer surface 20 of the shell is coated with a suitable sealing coating, e.g., of a graphite suspension or a refractory suspension that effectively seals its pores. The inner surface 18 of the shell is free of such coating.

Figure 2:
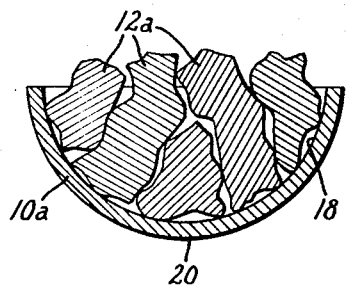
FIG. 2 is a cross sectional view illustrating one step in a method embodying one form of our invention.

As shown in FIG. 2, we place in this hemispherical shell 10a a quantity of metal 12a, which in the final electrode forms the backing portion 12. This metal is preferably one of the copper-base alloys referred to hereinabove.

We then place the shell 10a containing the backing alloy 12a in a chamber filled with a reducing atmosphere such as dry hydrogen; and we heat the parts in this hydrogen atmosphere to a sufficiently high temperature, e.g., 2,100° F., to melt both the backing alloy 12a and the copper infiltrant within the shell 10. When this melting occurs, the molten copper and the molten copper alloy mix together in the interface region 18 and the resulting mix infiltrates into the refractory metal compact in this interface region. The hydrogen serves in a known manner during heating to reduce any surface oxides that are present and to facilitate wetting of the refractory metal particles by the molten metal, thus facilitating infiltration of the molten metal into the refractory compact. It is, of course, understood that the temperature to which the assembly is raised is well below the melting point of the refractory metal.

While the infiltrant and the backing alloy are still molten, we purge the surrounding chamber of hydrogen by shutting off the hydrogen supply and introducing an inert atmosphere, e.g., of argon, that completely replaces the hydrogen atmosphere. The backing alloy is kept molten in the inert atmosphere for a sufficient time, e.g., about one hour, to effectively remove most of the dissolved hydrogen. The temperature is then slowly reduced, allowing the molten metal to cool and eventually solidify in the argon atmosphere. This controlled solidification in argon also serves as a degassing procedure which further eliminates dissolved gases, especially the hydrogen reducing agent, from the molten metal and results in a sound casting free of porosity. The parts are then in the form shown in FIG. 3.

Figure 3:
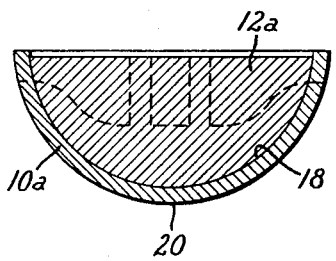
FIG. 3 illustrates the parts at another stage during practice of our method.

The structure of FIG. 3, while still hot, is then transferred to an argon-filled cooling chamber where rapid cooling takes place. This rapid cooling leaves the material, if it is a solution-treatable alloy, in a solution-treated condition which responds to subsequent aging by increasing the material's hardness and strength. Such aging is effected by reheating to a suitable moderate temperature. The electrode structure is maintained in argon during the above-described transfer to the cooling chamber.

Thereafter, the structure of FIG. 3 is machined along the dotted line surfaces shown to provide an electrode of the shape shown in FIG. 1. The previously described sealing coating on the outer surface 20 of the shell is removed either by machining, abrasive cleaning, tumbling or some similar process.

It will be apparent that during the above-described heating, melting, and solidification steps, the shell 10a acted as a mold. The backing metal 12a in FIG. 3 is, in effect, a casting within this mold. It has been found that along interface 18 between the mold and casting there is a very strong, void-free bond capable of successfully withstanding large temperature changes despite the widely different coefficients of thermal expansion of the metals of the mold and the casting.

Although we prefer to use an inert gas as the environment in which cooling to solidification takes place following the infiltration step, it is to be understood that we could alternatively use a vacuum environment. In either case, the dissolved hydrogen is transferred from the molten metal to the inert atmosphere as the molten metal stands in the inert atmosphere and cools toward solidification.

In the course of our investigation, we made a number of samples in which cooling to solidification was performed in the hydrogen reducing atmosphere. We found that the solid backing metal resulting from this procedure had a high degree of porosity which left it mechanically weak and unusable for electrodes such as we are concerned with.

In a modified form of the invention, we begin the step shown in FIG. 2 with a sintered refractory metal shell 10 that is free of infiltrant. In the same manner as previously described, we place the backing alloy 12a in this shell and heat these parts in a hydrogen atmosphere to a sufficiently high temperature to melt the backing metal. The molten backing metal then flows into the porous refractory shell and completely impregnates it. Sufficient alloy is available to impregnate the refractory shell and form the backing casting. The hydrogen atmosphere is then replaced with an argon atmosphere; the assembly is held in this argon atmosphere for about 1 hour at a temperature sufficient to keep the backing metal molten; after which the assembly is cooled in argon sufficiently to solidify the backing alloy. The holding at high temperature and cooling in argon eliminates dissolved gases and provides a sound casting in the same manner as previously described. Subsequent cooling is performed more rapidly in a cooling chamber, as explained in connection with the first embodiment.

It will be apparent that casting of the backing alloy 12a and infiltration of the refractory shell 10 into the shell was accomplished in one step in the modified process. There was no need to infiltrate the refractory shell 10a as a separate step prior to casting of the backing alloy.

It will be apparent from the above description that it was unnecessary in our process to pre-form the backing metal prior to joining it to the arcing portion. Certain prior processes that rely upon brazing between these two parts have required such pre-forming prior to brazing and have produced weak joints unless the pre-forming was controlled with great precision to provide a close match with the internal surface of the shell. By casting the backing metal in the shell as a mold, we eliminate the need for such pre-forming and also eliminate the need for any brazing step inasmuch as our casting step by itself produces an excellent bond between the mold and the casting.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

We claim:
1. A method for making an arcing electrode comprising:
   a. providing a cup-shaped shell of sintered refractory metal particles,
   b. placing within the cup-shaped shell a quantity of non-refractory backing metal,
   c. heating the shell containing said backing metal in a reducing atmosphere to a temperature above the melting point of the backing metal, thereby melting the backing metal and causing a portion of the backing metal to infiltrate into the shell,
   d. replacing the reducing atmosphere with an inert environment to which said backing metal is exposed while still molten,
   e. holding the shell and backing metal in said inert environment while the backing metal is molten for a sufficient time to remove a substantial quantity of dissolved gases from said backing metal,
   f. cooling the shell and backing metal in said inert environment to cause solidification of said backing metal and to remove additional dissolved gases from said molten backing metal as it cools toward solidification,
   g. the backing metal upon solidification bonding to the juxtaposed region of the shell.
2. The method of claim 1 in which said reducing atmosphere consists essentially of hydrogen.
3. The method of claim 1 in which said reducing atmosphere consists essentially of hydrogen and said inert environment is constituted by an inert gas.
4. The method of claim 3 in which said inert gas consists essentially of argon.
5. The method of claim 1 in which said inert environment is a vacuum.
6. The method of claim 1 in which:
   a. said sintered shell is uninfiltrated prior to entry of said molten backing metal into its pores, and
   b. said backing metal upon melting substantially completely infiltrates said shell.
7. The method of claim 1 in which:
   a. said sintered shell has been infiltrated with a non-refractory metal infiltrant prior to heating of the backing metal therein,
   b. said infiltrant is also melted during said heating step, and
   c. said backing metal and said infiltrant unite upon solidification.
8. The method of claim 1 in which:
   a. said sintered shell has been infiltrated with a non-refractory metal infiltrant prior to heating of the backing metal,
   b. and said backing metal and said infiltrant unite upon solidification.
9. The method of claim 1 in which the molten backing metal is maintained in said inert environment for a sufficient period of time to remove from the body of said backing metal substantially all gases that would produce voids in said backing metal upon solidification.
10. The method of claim 1 in which the molten backing metal is maintained in said inert environment for a sufficient period of time to remove most of the dissolved reducing atmosphere from the body of said backing metal.

* * * * *